(12) United States Patent
Kai

(10) Patent No.: US 6,384,768 B1
(45) Date of Patent: May 7, 2002

(54) FM PULSE DOPPLER RADAR APPARATUS

(75) Inventor: Koichi Kai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,635

(22) Filed: Aug. 10, 2000

(30) Foreign Application Priority Data

Mar. 17, 2000 (JP) ........................................ 2000-076536

(51) Int. Cl.$^7$ .............................................. G01S 13/93
(52) U.S. Cl. .............................. 342/70; 342/89; 342/94; 342/104; 342/109; 342/118; 342/128; 342/134; 342/165; 342/173; 342/195
(58) Field of Search ................... 342/104–118, 128–141, 342/195, 70, 71, 72, 159, 165, 169–175, 99, 82, 89, 94

(56) References Cited

U.S. PATENT DOCUMENTS 6,121,919 A * 9/2000 Ameen et al. ............... 342/174

FOREIGN PATENT DOCUMENTS

| JP | 02036386 A | * | 2/1990 | ................. 342/128 |
| JP | 04093684 A | * | 3/1992 | ................. 342/99 |
| JP | 05045448 A | * | 2/1993 | ........... G01S/13/28 |
| JP | 11-202045 A |   | 7/1999 |   |

* cited by examiner

*Primary Examiner*—Bernarr E. Gregory
(74) *Attorney, Agent, or Firm*—Sughrue Mion, PLLC (57) ABSTRACT

AN FM pulse Doppler radar apparatus performs pulse modulation of modulating waves having repeatedly increasing and decreasing frequency, transmits thus modulated waves, receives at each range gate having an interval equivalent to a pulse width, reflected waves reflected from an object, determines a distance according to the range gate, and calculates the distance to the object and the relative velocity of the object based on the difference between frequencies of the transmission waves and the received waves. The apparatus includes a velocity determining unit for determining velocity of the radar-mounted vehicle and a comparison-and-detection unit for comparing the detected distance according to the range gate and the distance calculated based on the difference between the frequencies of the transmission waves and the received waves. The comparison-and-detection unit detects, based on the velocity of the vehicle and the relative velocity between the vehicle and the object, a distance error due to an error in transmission frequency bandwidth.

10 Claims, 10 Drawing Sheets

FM PULSE DOPPLER RADAR APPARATUS

BACKGROUND OF THE INVENTION

1. Field of the Invention

The present invention relates generally to Doppler radar, and more particularly to an FM pulse Doppler radar apparatus, such as a radar apparatus mounted on a vehicle, for determining the distance to an object.

2. Description of the Related Art

Figure 10:
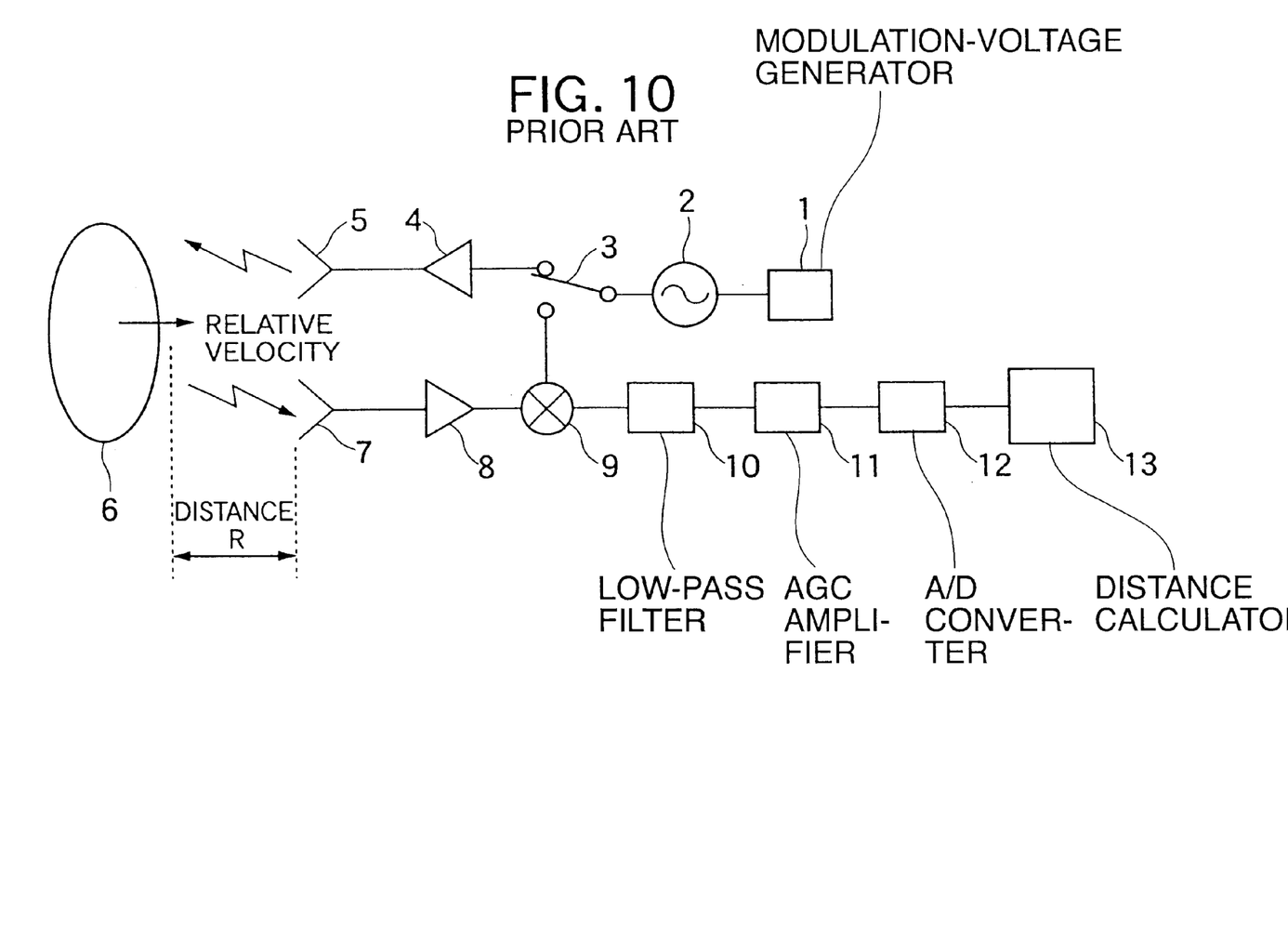
FIG. 10 is a block diagram of a conventional FM pulse Doppler radar apparatus.

As for this type of radar apparatus, an FM pulse Doppler radar illustrated in FIG. 10 is known in the art. Referring to FIG. 10, the FM pulse Doppler radar apparatus includes a modulation-voltage generator 1, a voltage-controlled oscillator (triangular wave generator) 2 for generating electromagnetic waves having transmission frequency $f_{tx}$ of, for example, 76 to 77 GHz, a transmit-receive switch 3 for switching the output feed of the electromagnetic waves generated by the voltage-controlled oscillator 2 between a transmitting amplifier 4 and a receiving mixer 9, the transmitting amplifier 4 for amplifying the power of the electromagnetic waves fed by the transmit-receive switch 3, and a transmitting antenna 5 for radiating the electromagnetic waves amplified by the transmitting amplifier 4.

Further in FIG. 10, an object 6 is a target to be detected by the radar. The apparatus also includes a receiving antenna 7 for receiving the electromagnetic waves radiated to and reflected from the object 6, and a receiving amplifier 8 for amplifying the received electromagnetic waves.

The apparatus further includes the mixer 9 for outputting beat signals corresponding to the distance and relative velocity of the object 6 by mixing transmission electromagnetic waves switched by the transmit-receive switch 3 and electromagnetic waves reflected back from the object 6, a low-pass filter 10 of which the cut-off frequency is the inverse of the transmission pulse time width, an AGC amplifier 11 capable of controlling the gain according to the received power of the reflected waves, an A/D converter 12 for converting the beat signals into digital signals, and a distance calculator 13 for calculating the distance and relative velocity of the object 6 based on the A/D values.

An electromagnetic wave transmitting operation of a typical known radar apparatus having the above-described structure will now be described.

Figure 2:
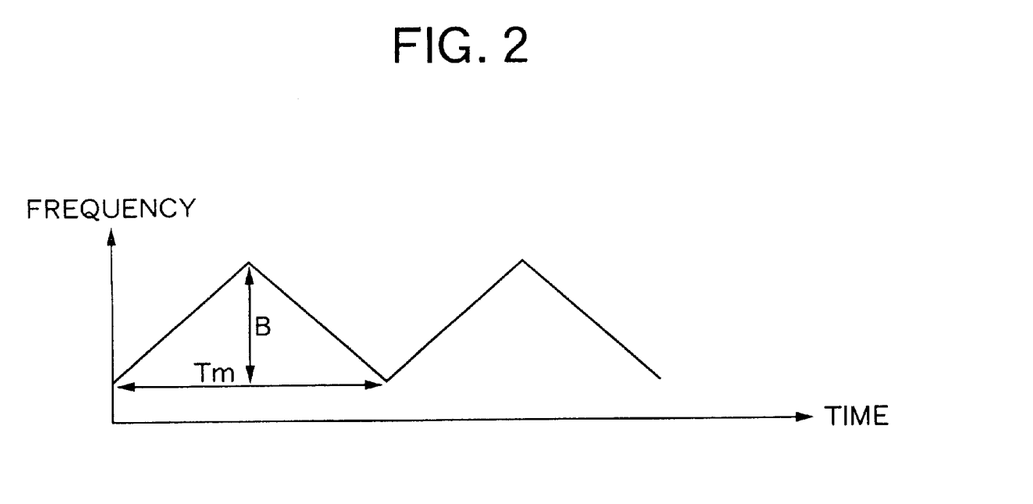
FIG. 2 is a graph illustrating modulated electromagnetic waves output by a voltage-controlled oscillator.

First, the voltage-controlled oscillator 2 outputs electromagnetic waves (triangular wave signals) modulated, for example, as in FIG. 2, corresponding to the voltage signals from the modulation-voltage generator 1. The electromagnetic waves output from the voltage-controlled oscillator 2 are fed to the transmitting amplifier 4 by the transmit-receive switch 3 and are amplified therein. The electromagnetic waves amplified by the transmitting amplifier 4 are radiated from the transmitting antenna 5.

Next, an electromagnetic wave receiving-operation will be described. The transmit-receive switch 3 is switched to the receiving side to connect the voltage-controlled oscillator 2 and the mixer 9 when a pulse time width $T_g$, for example, of 33.3 ns (=1/30 MHz, equivalent to a distance of 5 m) has elapsed from the time electromagnetic wave transmission was initiated. The electromagnetic waves sent from the transmitting antenna 5 form pulse waves, each pulse having a duration of 33.3 ns. The pulse waves are reflected ago by the object 6 at a distance R, and input to the receiving antenna 7 after a delay time Δt depending on the distance R relative to the transmitted electromagnetic waves.

Figure 3:
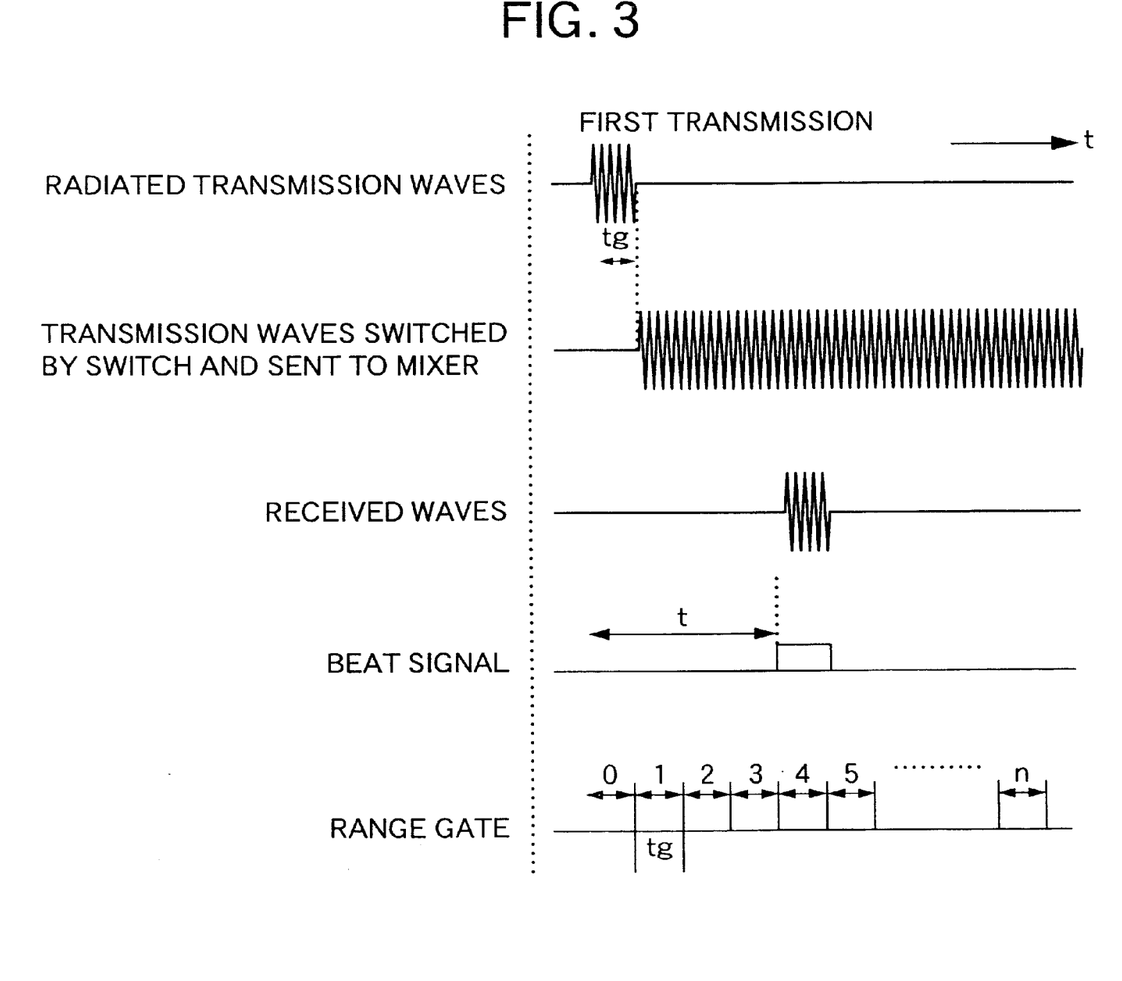
FIG. 3 is an explanatory view of beat signals.

When the object 6 has a relative velocity, the frequency of the received electromagnetic waves is Doppler-shifted relative to the frequency of the transmission electromagnetic waves, and they are input to the receiving antenna 7. The electromagnetic waves input to the receiving antenna 7 are amplified by the receiving amplifier 8 and mixed with the transmission electromagnetic waves from the voltage-controlled oscillator 2 by the mixer 9 to output beat signals shown in FIG. 3. The beat signals thus acquired pass through the low-pass filter 10, of which the cut-off frequency is, for example, 30 MHz, are amplified by the AGC amplifier 11, are input in the A/D converter 12, and are converted to digital signals.

Next, a method for calculating the distance and relative velocity of the object 6 by the distance calculator 13 based on the output data from the A/D converter 12 is explained.

Figure 4:
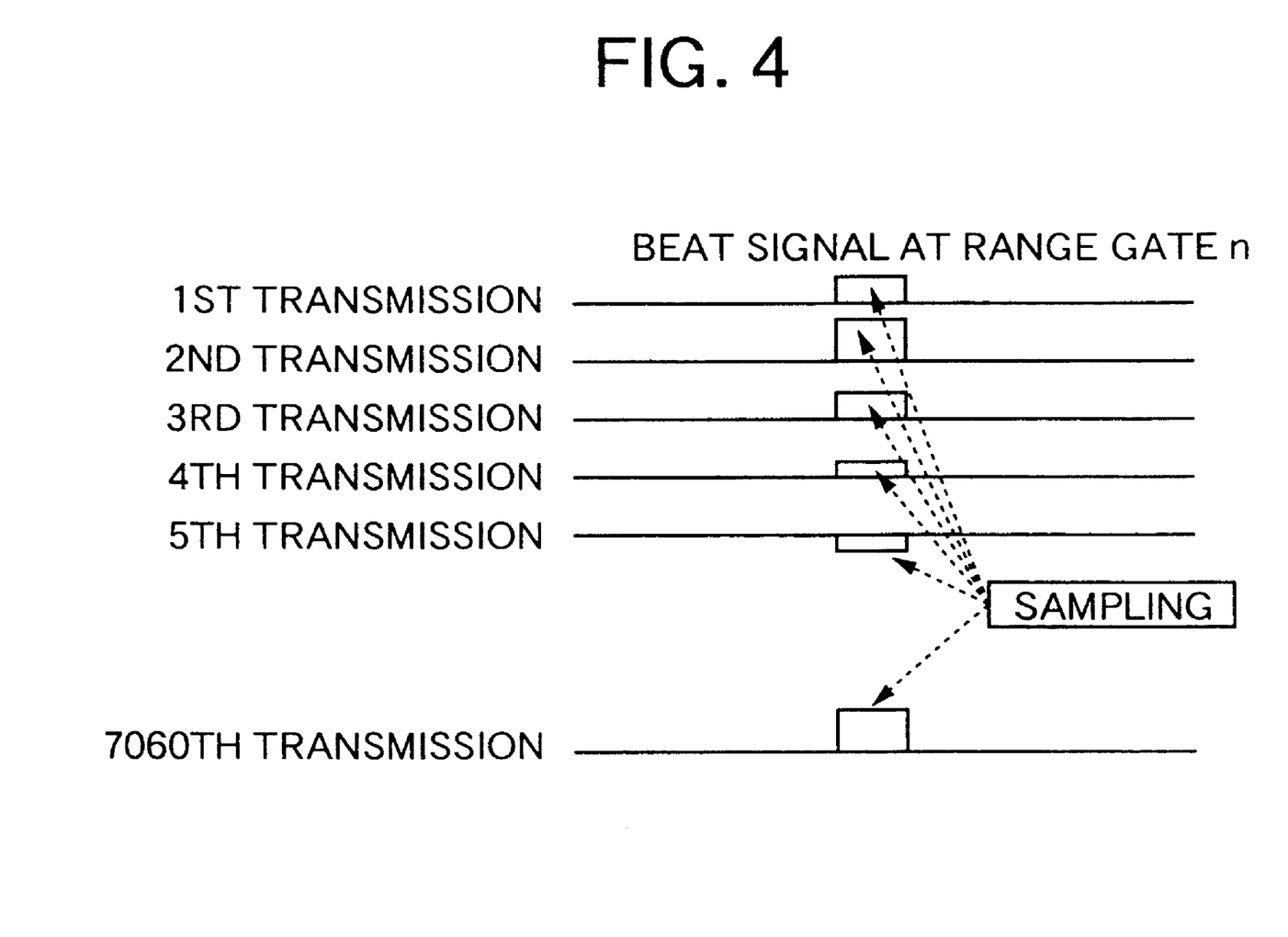
FIG. 4 is an explanatory view of a process for receiving transmission wave outputs at each range gate.
Figure 5:
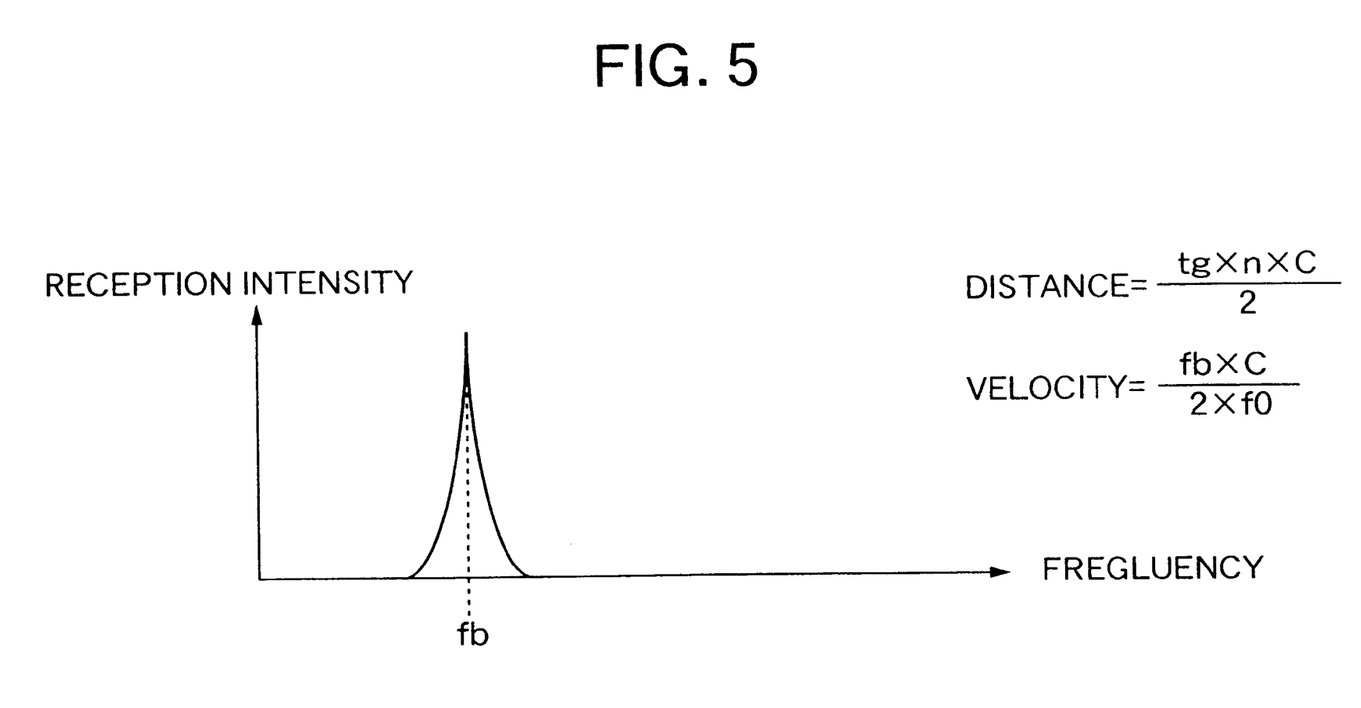
FIG. 5 is an explanatory view of a process for outputting a Doppler shift at a particular range gate.

For the purpose of understanding, it is assumed that the voltage-controlled oscillator 2 does not perform FM modulation and the transmission frequency $f_{tx}$ is fixed to 76.5 GHz. In order to obtain a velocity resolution of 1 km/h, a Doppler frequency resolution Δf is:

$$\Delta f = \frac{2\Delta v}{\lambda} = \frac{2 \times 0.2777 \, m/s}{0.003921 \, m} = 141.64 \; (Hz) = \frac{1}{7.05977 \; (ms)} = \frac{1}{Tm} \quad (1)$$

and a calculation time $T_m$ of approximately 7.06 ms is required. If, for example, the maximum detection range is set to 150 m, then the transmission wave output cycle is 33.3 ns×(150/5)=1 μs. In order to obtain the velocity resolution of 1 km/h, the above-described device acquires, at each range gate, beat signals for the transmitted waves output 7060 times, as in FIG. 4, and performs, for each of the range gates, a fast-Fourier-transform of all the data. Then the beat frequency at a particular range gate is output as shown in FIG. 5.

The distance $R_g$ and the relative velocity V may be calculated using equations (2) and (3) below:

$$Rg = \frac{tg \times n \times C}{2} \quad (2)$$

$$V = \frac{fb1 \times C}{2 \times f0} \quad (3)$$

where $t_g$ is a range gate time width (pulse time width), n is a range gate number, c is the speed of light, $f_{b1}$ is a Doppler frequency (=beat frequency), and $f_0$ is the transmission frequency (76.5 GHz).

Now, consider that the above-described transmission electromagnetic waves are modulated as in FIG. 2. Suppose that during the above-described calculation time $T_m$ of approximately 7.06 ms, the transmission frequency is increasing steadily from 76.425 to 76.575 GHz, the bandwidth B being 150 MHz. The time t required for the electromagnetic waves to be transmitted from the transmitting antenna 5, reflected from the object 6 and input to the receiving antenna 7 may be found by the following equation (4):

$$t = \frac{distance \times 2}{C} \quad (4)$$

As the transmission frequency is increasing steadily during the time t, the beat frequency $f_{bu}$ is found by summing the Doppler frequency $f_{b1}$ due to the relative velocity and $f_{b2}$ which represents the difference between transmission frequency and the received frequency corresponding to the distance, as follows:

$$fbu = fb2 + fb1 \quad (5)$$

Likewise, suppose that the transmission frequency is steadily decreasing from 76.575 GHz to 76.425 GHz, the bandwidth B being 150 MHz, during the next calculation time $T_m$ of approximately 7.06 ms. As the transmission frequency is decreasing during time t required for the electromagnetic waves to be output from the transmitting antenna 5, reflected from the object 6 and input to the receiving antenna 7, the beat frequency $f_{b1}$ may be obtained by summing a Doppler frequency $f_{b1'}$ due to the relative velocity and $f_{b2'}$ which represents the difference between the transmission frequency and the received frequency corresponding to the distance. The interval of increasing/decreasing the frequency, the distance, and the relative velocity between the radar and the object may be the same as in the foregoing case of increasing the frequency. Because the bandwidth remains constant and the increase/decrease rate is equal, $f_{b1}=f_{b1'}$ and $f_{b2'}=-f_{b2}$. The beat frequency $f_{bd}$ may be obtained by equation (6) below:

$$fbd = fb2' + fb1' = -fb2 + fb1 \qquad (6)$$

As the beat frequency $f_{bu}$ can be obtained by increasing the transmission frequency and the beat frequency $f_{bd}$ can be obtained by decreasing the transmission frequency as described above, the Doppler frequency $f_{b1}$ due to the relative velocity, and $f_{b2}$ which represents the difference between the transmission frequency and received frequency corresponding to the distance may be found by equation (7) below:

$$fb1 = \frac{fbu + fbd}{2}, fb2 = \frac{fbu - fbd}{2} \qquad (7)$$

As $f_{b2}$ represents a frequency increase or decrease during the time t in equation (4), the following equation (8) can be derived:

$$\frac{fb2}{B} = \frac{t}{Tm} \qquad (8)$$

Using equations (4) and (8), a distance $R_b$ can be obtained from $f_{b2}$ as in the following equation (9):

$$Rb = \frac{Tm \times C}{2 \times B} \times fb2 \qquad (9)$$

It is apparent from equation (9) that the distance $R_b$ is proportional to $f_{b2}$. A distance resolution is $\Delta R$ and a frequency resolution of $f_{b2}$ is $\Delta f(=1/(T_m/2))$ are obtained as follows:

$$\Delta R = \frac{Tm \times C}{4 \times B} \Delta f = \frac{C}{2 \times B} \qquad (10)$$

By increasing B to 300 MHz, a resolution $\Delta R$ of 0.5 m, a higher resolution than the distance $R_g$, is achieved.

Even when the beat frequency due to noise arising from various sources is detected at a certain range gate, it can be identified as noise and eliminated if the difference between the distance $R_g$ obtained by equation (2) and the distance $R_b$ obtained by equation (9) is a range gate width of 5 m or more.

In theory, the distances obtained by equations (2) and (9) should coincide within the scope of a range gate width. However, in reality, errors in the transmission frequency bandwidth B occur due to variation in component devices or temperature changes, which cause errors in the distance $R_b$ obtained by equation (9).

For example, when variation in component devices causes the transmission frequency bandwidth B to be 1.1 times the prescribed width, the distance obtained by equation (9) is:

$$Rg = \frac{Tm \times C}{2 \times (1.1 \times B)} \times fb2 = \frac{Tm \times C}{2 \times B)} \times fb2 \times \frac{1}{1.1} \qquad (11)$$

which is 1/1.1 times the correct distance.

Likewise, when the transmission frequency bandwidth B is varied from 0.9 to 1.2 times the prescribed width due to temperature changes, the distance obtained by equation (9) also varies from 1/0.9 to 1/1.2 times the correct distance.

One way to avoid such difficulties is to minimize the difference between elements or temperature changes as much as possible. In order to do so, however, it is necessary to use expensive materials or to detect and adjust the error in the bandwidth B of individual apparatuses at the time of assembly.

SUMMARY OF THE INVENTION

Accordingly, it is an object of the present invention to provide an FM pulse Doppler radar apparatus which detects an error even when there is an error in a transmission frequency bandwidth B, and which effectively corrects the error based on that error. When the error is large, the apparatus determines that the apparatus is functioning abnormally.

It is another object of the present invention to provide an FM pulse Doppler radar apparatus that accurately identifies whether the source of error is noise, a distance error, or an abnormality of the apparatus.

Still another object of the present invention is to provide an FM pulse Doppler radar apparatus that accurately detects the distance error and corrects a distance calculation result based on the detected error.

Yet a further object of the present invention is to provide an FM pulse Doppler radar apparatus capable of calculating an accurate correction value.

According to the present invention, the foregoing objects are achieved through provision of an FM pulse Doppler radar apparatus which performs pulse modulation of modulating waves having repeatedly increasing and decreasing frequency, which transmits the thus modulated waves, receives, at each range gate having an interval equivalent to a pulse width, reflected waves reflected by at least one object, determines a distance corresponding to the range gate, and calculates a distance to the at least object and the relative velocity of the at least one object based on a difference between the frequencies of the transmission waves and the received waves. The FM pulse Doppler radar apparatus includes a velocity determining unit for determining the velocity of a vehicle on which the FM pulse Doppler radar apparatus is mounted, and a comparison-and-detection unit for comparing the obtained distance corresponding to the range gate and a distance calculated based on the difference between the frequencies of the transmission waves and the received waves, and for detecting, based on the velocity of the radar-mounted vehicle and the relative velocity between the vehicle and the at least one object, a distance error due to an error in transmission frequency bandwidth.

Preferably, the comparison-and-detection unit detects the distance error due to the error in the transmission frequency bandwidth by comparing the detected range gate number and a range gate number obtained by an inverse operation from the distance calculated from the difference between the frequencies of the transmission waves and the received waves.

The comparison-and-detection unit may temporally total distance errors due to each error in the transmission frequency bandwidth obtained from a plurality of the objects, and may find the average of the total.

The comparison-and-detection unit may detect the distance error due to the error in the transmission frequency bandwidth, and may correct the distance calculation result based on the distance error.

The comparison-and-detection unit may correct the distance calculation result by detecting the distance error due to the error in transmission frequency bandwidth and by correcting the error in the bandwidth of the transmission frequency based on the detected distance error.

The comparison-and-detection unit may detect the distance error due to the error in the transmission frequency bandwidth only when the object used for the error detection is stationary.

The comparison-and-detection unit may detect the distance error due to the error in the transmission frequency bandwidth only when the radar-mounted vehicle as well as the object used for the error detection are stationary.

The comparison-and-detection unit detects the distance error due to the error in the transmission frequency bandwidth only when the object used for the error detection is a travelling vehicle being followed by the radar-mounted vehicle.

The comparison-and-detection unit may temporally adds up distance data on each of the objects calculated from the difference between the frequencies of the transmission waves and the received waves at each range gate, and may detect the distance error due to the error in the transmission frequency bandwidth from the frequency distribution of the distance data.

When the distance error due to the error in the transmission frequency bandwidth may exceeds a predetermined value, the comparison-and-detection unit may determine that the apparatus is functioning abnormally.

DESCRIPTION OF THE PREFERRED EMBODIMENTS

First Embodiment

Figure 1:
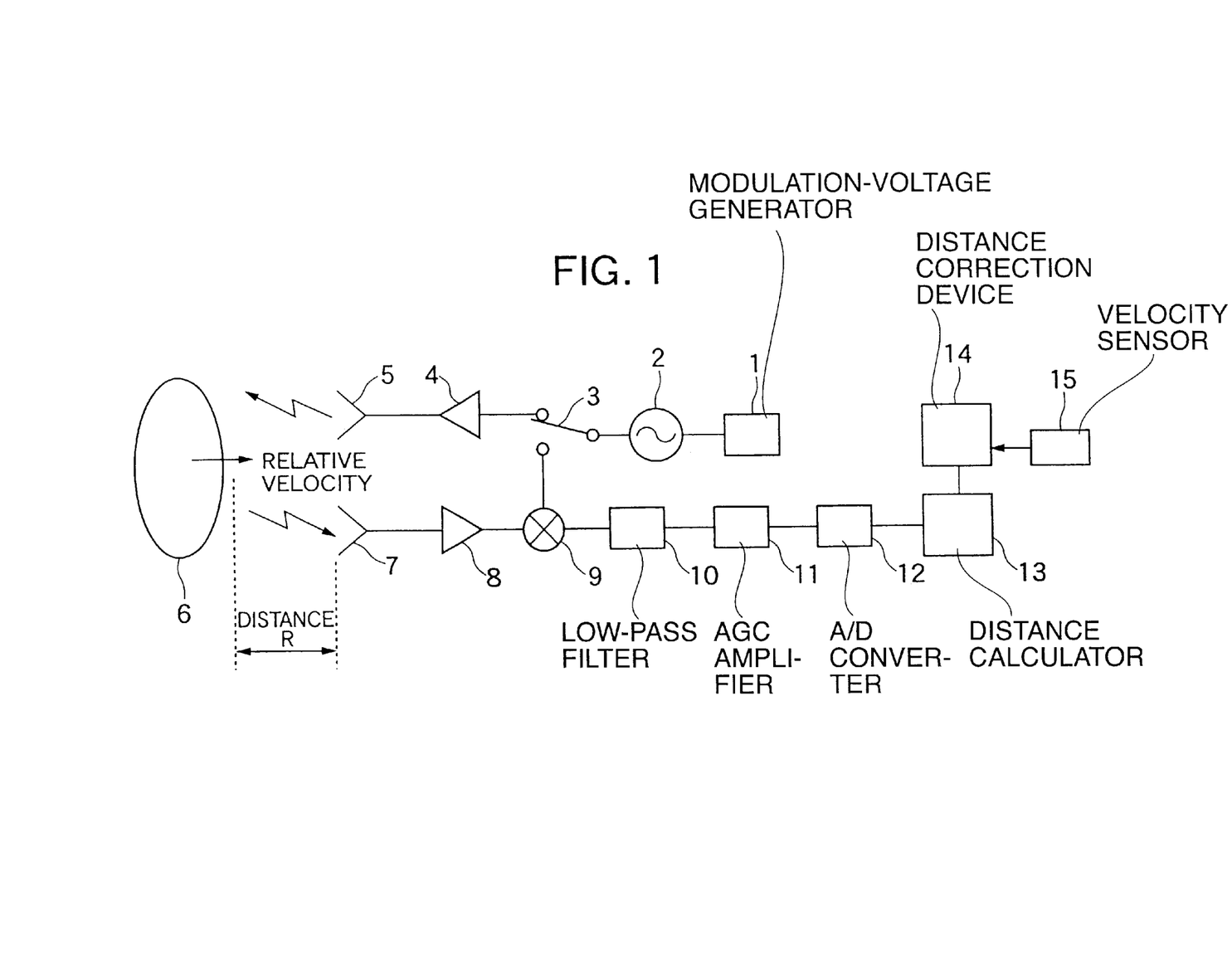
FIG. 1 is a block diagram of an FM pulse Doppler radar apparatus according to a first embodiment of the present invention.

FIG. 1 is a block diagram illustrating an FM pulse Doppler radar apparatus according to a first embodiment of the present invention. Referring to FIG. 1, the FM pulse Doppler radar apparatus includes a modulation-voltage generator 1, a voltage-controlled oscillator (triangular wave generator) 2 for generating electromagnetic waves having transmission frequency $f_{tx}$ of, for example, 76 to 77 GHz, a transmit-receive switch 3 for switching the output feed of the electromagnetic waves generated by the voltage-controlled oscillator 2 between a transmitting amplifier 4 and a receiving mixer 9, the transmitting amplifier 4 for amplifying the power of electromagnetic waves fed by the transmit-receive switch 3, and a transmitting antenna 5 for radiating the electromagnetic waves amplified by the transmitting amplifier 4.

Further in FIG. 1, an object 6 is a target to be detected by the radar. The apparatus also includes a receiving antenna 7 for receiving the electromagnetic waves radiated to and reflected from the object 6, and a receiving amplifier 8 for amplifying the received electromagnetic waves.

The apparatus further includes a mixer 9 for outputting beat signals corresponding to the distance to and the relative velocity of the object 6 by mixing transmission electromagnetic waves switched by the transmit-receive switch 3 and electromagnetic waves reflected from the object 6, a low-pass filter 10 of which the cut-off frequency is the inverse of transmission pulse time width, an AGC amplifier 11 capable of controlling gains according to the received power of reflected waves, an A/D converter 12 for converting beat signals into digital signals, and a distance calculator 13 for calculating the distance and relative velocity of the object 6 based on the A/D value. Like reference numerals designate identical or corresponding parts throughout several views explained hereafter.

An electromagnetic wave transmitting operation of a typical known radar apparatus having the above-described structure will now be described.

First, the voltage-controlled oscillator 2 outputs electromagnetic waves (triangular wave signals) modulated, for example, as in FIG. 2, corresponding to the voltage signals from the modulation-voltage generator 1. The electromagnetic waves output from the voltage-controlled oscillator 2 are fed to the transmitting amplifier 4 by the transmit-receive switch 3 and amplified therein. The electromagnetic waves amplified by the transmitting amplifier 4 are radiated from the transmitting antenna 5.

Next, an electromagnetic wave receiving operation will be described. The transmit-receive switch 3 is switched to the receiving side to connect the voltage-controlled oscillator 2 and the mixer 9 when a pulse time width $T_g$, for example, of 33.3 ns (=1/30 MHz, equivalent to the distance of 5 m) has elapsed from the time electromagnetic wave transmission was initiated. The electromagnetic waves radiated from the transmitting antenna 5 form pulse waves, each pulse having duration of 33.3 ns. The pulse waves are reflected by the object 6 at a distance R, and are input to the receiving antenna 7 at a delay time $\Delta t$ depending on the distance R relative to the transmitted electromagnetic waves.

When the object 6 has relative velocity, the frequency of the received electromagnetic waves is Doppler-shifted relative to the frequency of the transmission electromagnetic wave, and is input to the receiving antenna 7. The electromagnetic waves input to the receiving antenna 7 are amplified by the receiving amplifier 8 and mixed with the transmission electromagnetic waves from the voltage-controlled oscillator 2 by the mixer 9 to output beat signals shown in FIG. 3. The beat signals thus acquired pass through the low-pass filter 10 of which the cut-off frequency is, for example, 30 MHz, are amplified by the AGC amplifier 11, are input in the A/D converter 12, and are converted to digital signals.

Next, a method for calculating the distance and relative velocity of the object 6 by the distance calculator 13 based on the output data from the A/D converter 12 is explained.

For the purpose of understanding, it is assumed that the voltage-controlled oscillator 2 does not perform FM modulation and the transmission frequency $f_{tx}$ is fixed to 76.5 GHz. In order to obtain a velocity resolution of 1 km/h, a Doppler frequency resolution $\Delta f$ is:

$$\Delta f = \frac{2\Delta v}{\lambda} = \frac{2 \times 0.2777 \, m/s}{0.003921 \, m} = 141.64 \; (Hz) = \frac{1}{7.05977 \, (ms)} = \frac{1}{Tm} \quad (12)$$

and a calculation time $T_m$ of approximately 7.06 ms is required. If, for example, the maximum detection range is set to 150 m, then the transmission wave output cycle is 33.3 ns×(150/5)=1 μs. In order to obtain the velocity resolution of 1 km/h, the above-described device acquires, at each range gate, beat signals for the transmitted waves output 7060 times, as in FIG. 4, and performs, for each of the range gate, a fast-Fourier-transform of all the data. Then the beat frequency at a particular range gate is output as shown in FIG. 5.

The distance $R_g$ and the relative velocity V may be calculated using equations (13) and (14) below:

$$Rg = \frac{tg \times n \times C}{2} \quad (13)$$

$$V = \frac{fb1 \times C}{2 \times f0} \quad (14)$$

where $t_g$ is a range gate time width (pulse time width), n is a range gate number, c is the speed of light, $f_{b1}$ is a Doppler frequency (=beat frequency), and $f_0$ is a transmission frequency (=76.5 GHz).

Now, consider that the above-described transmission electromagnetic waves are modulated as in FIG. 2. Suppose that during the above-described calculation time $T_m$ of approximately 7.06 ms, the transmission frequency is increasing steadily from 76.425 to 76.575 GHz, the bandwidth B being 150 MHz. The time t required for the electromagnetic waves to be transmitted from the transmitting antenna 5, reflected from the object 6 and input to the receiving antenna 7 may be found by the following equation (15).

$$t = \frac{distance \times 2}{C} \quad (15)$$

As the transmission frequency is increasing steadily during the time t, the beat frequency $f_{bu}$ is found by summing the Doppler frequency $f_{b1}$ due to the relative velocity and $f_{b2}$ which represents the difference between transmission frequency and received frequency corresponding to the distance, as follows:

$$fbu = fb2 + fb1 \quad (16)$$

Likewise, suppose that the transmission frequency is steadily decreasing from 76.575 GHz to 76.425 GHz, the bandwidth B being 150 MHz, during the next calculation time $T_m$ of approximately 7.06 ms. As the transmission frequency is decreasing during time t required for the electromagnetic waves to be output from the transmitting antenna 5, reflected from the object 6 and input to the receiving antenna 7, the beat frequency $f_{bd}$ may be obtained by summing a Doppler frequency $f_{b1'}$ due to the relative velocity and $fb_{2'}$ which represents the difference between the transmission frequency and the received frequency corresponding to the distance. The interval of increasing/decreasing the frequency, the distance and the relative velocity between the radar and the object may be the same as in the foregoing case of increasing the frequency. Because the bandwidth remains constant and the increase/decrease rate is equal, $f_{b1} = f_{b1'}$, and $f_{b2'} = -f_{b2}$. A $f_{bd}$ may be obtained by equation (17) below:

$$fbd = fb2' + fb1' = -fb2 + fb1 \quad (17)$$

As the beat frequency $f_{bu}$ can be obtained by increasing the transmission frequency and the beat frequency $f_{bd}$ can be obtained by decreasing the transmission frequency as described above, the Doppler frequency $f_{b1}$ due to the relative velocity, and $f_{b2}$ which represents the difference between the transmission frequency and received frequency corresponding to the distance may be found by equation (18) below:

$$fb1 = \frac{fbu + fbd}{2}, \; fb2 = \frac{fbu - fbd}{2} \quad (18)$$

As $f_{b2}$ represents a frequency increase or decrease during the time t in equation (15), the following equation (19) can be derived:

$$\frac{fb2}{B} = \frac{t}{Tm} \quad (19)$$

Using equations (15) and (19), a distance $R_b$ can be obtained from $f_{b2}$ as in the following equation (20).

$$Rb = \frac{Tm \times C}{2 \times B} \times fb2 \quad (20)$$

It is apparent from equation (20) that the distance $R_b$ is in proportion to $f_{b2}$. A distance resolution is $\Delta R$ and a frequency resolution of $f_{b2}$ is $\Delta f (= 1/(T_m/2))$ are obtained as follows:

$$\Delta R = \frac{Tm \times C}{4 \times B} \Delta f = \frac{C}{2 \times B} \quad (21)$$

By increasing B to 300 MHz, a resolution RΔ of 0.5 m, a higher resolution than the distance $R_g$ obtained by equation (13), is achieved.

Even when the beat frequency due to noise arising from various sources is detected at a certain range gate, it can be identified as noise and eliminated if the difference between the distance $R_g$ obtained by equation (13) and the distance $R_b$ obtained by equation (20) is a range gate width of 5 m or more.

For example, suppose that the actual distance of the object 6 is 52 m and the relative velocity thereof is 0 km/h. The distance $R_g$ obtained by equation (13) is 50 m whereas the distance $R_b$ obtained by equation (20) is 52 m.

If an error in voltage fed to the voltage-controlled oscillator 2 or an error during conversion from voltage to transmission frequency in the voltage-controlled oscillator 2 due to dispersion of elements and temperature changes causes the bandwidth B to decrease to 0.9 times the prescribed width, the distance $R_g$ obtained from equation (13) is 50 m, whereas the distance $R_b$ obtained by equation (20) is $52/0.9 \approx 58$ m.

When the distance $R_g$ obtained by equation (13) and the distance $R_b$ obtained by equation (20) are different, it is difficult to determine whether the cause of such a difference is noise or a distance error.

Meanwhile, when the velocity of the radar-mounted vehicle is determined to be 0 km/h, the relative velocity between the vehicle and the surrounding stationary objects is 0 km/h. Generally, when a vehicle is making a stop, typically when a vehicle is starting the engine, most of the surrounding objects are stationary objects. Also, when the velocity of the vehicle as well as the relative velocity is 0 km/h, it is generally known that the probability of noise disturbance is low. Consequently, when and only when the velocity of the vehicle as well as the relative velocity is 0 km/h, the distance correction device 14 according to the present embodiment determines that the cause of the difference between the distance $R_g$ obtained from equation (13) and the distance $R_b$ obtained from equation (20) is a distance error. In other words, when the velocity of the vehicle as well as the relative velocity is 0 km/h and the difference between distance $R_g$ obtained from equation (13) and the distance obtained from equation (20) is a range gate width of 5 m or more, the device determines that there is an error in the bandwidth B.

As the distance $R_b$ of the above-described object, at a distance of 52 m having relative velocity of 0 km, calculated by equation (20) is 58 m, the range gate number n found by an inverse operation from the distance $R_b$ is 11 according to equation (13). The actual range gate n, however, is 10. Thus, a correction value is:

$$k = \frac{10}{11} \quad (22)$$

By using this correction value k, the distance $R_b$ obtained from equation (20) is corrected as in equation (23) below, thereby reducing the distance error.

$$Rf' = Rf \times k = 58 \times \frac{10}{11} \approx 53 \,\text{m} \quad (23)$$

It is to be noted that the above case where the velocity of the vehicle as well as the relative velocity is 0 km/h is not the only case where there is a high probability of error in the bandwidth B. When the velocity of the radar-mounted vehicle is equal to the relative velocity, i.e., when the vehicle is travelling and the object is a stationary object, there is a high probability of error in the bandwidth B.

Also, when the radar-mounted vehicle is travelling and tracking preceding travelling vehicle, i.e., when both radar-mounted vehicle and the object are travelling, the relative velocity therebetween being 0 km/h, there is a high probability of error in the bandwidth B. Consequently, when the velocity of radar-mounted vehicle is equal to the relative velocity and when the relative speed between the radar-mounted vehicle and the object both of which are travelling is 0 km/h, the distance correction device determines that the cause of the difference between the values obtained from equations (13) and (20) is a distance error.

Still further, when a multiple of objects to be targeted for distance correction are present, accuracy of error detection is enhanced by obtaining a correction value for each of the objects and averaging the obtained values.

Also, the accuracy of error detection is enhanced by accumulating correction values for each calculation cycle and averaging the obtained values within a predetermined time period or filtering.

Further, when the correction value is greater than or less than a predetermined value, the device may identify that there is an abnormality in the apparatus.

Second Embodiment

Figure 6:
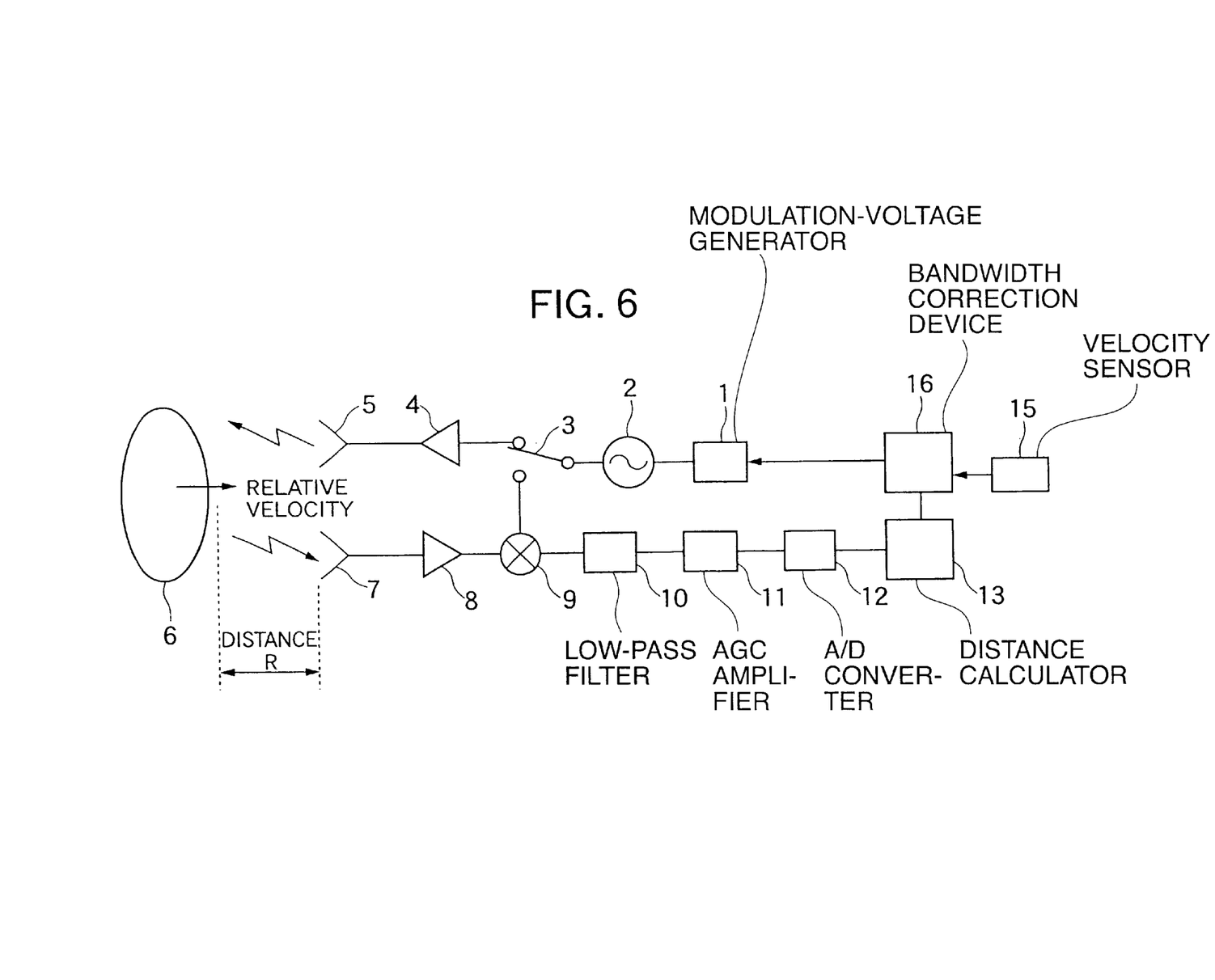
FIG. 6 is a block diagram of an FM pulse Doppler radar apparatus according to a second embodiment of the present invention.

FIG. 6 is a block diagram illustrating an FM pulse Doppler radar apparatus of a second embodiment according to the other aspect of the present invention. Referring to FIG. 6, the apparatus includes a bandwidth correction device 16, as the comparison-and-detection unit, for calculating a bandwidth correction value b based on a distance, relative velocity and range gate of the object 6 determined by the distance calculator 13 as well as the velocity of radar-mounted vehicle determined by the velocity sensor 15. The device 16 then controls the modulation-voltage generator 1 so that the voltage-controlled oscillator 2 generates electromagnetic waves having a-correct bandwidth. Other components are similar to those in the first embodiment.

In the present embodiment, the bandwidth correction device 16 as a comparison-and-detection unit implements the correction as in equation (24) below.

$$B = bB' \quad (24)$$

where B is a bandwidth when there is no error, B' is a bandwidth when there is an error, and b is a bandwidth correction value.

From equation (20), (22), and (24), the bandwidth correction value b may be obtained by the following equation (25):

$$b = \frac{1}{k} \quad (25)$$

For example, when the relationship between the generated voltage width $\Delta V$ of the modulation-voltage generator 1 and the bandwidth B can be expressed as in equation (26):

$$B = \alpha \times \Delta V (\alpha: \text{constant}) \quad (26)$$

the error in the bandwidth B is corrected by multiplying the generated voltage width $\Delta V$ by b which is a bandwidth correction value, and an accurate distance is calculated next time the distance calculation is performed.

Third Embodiment

Figure 7:
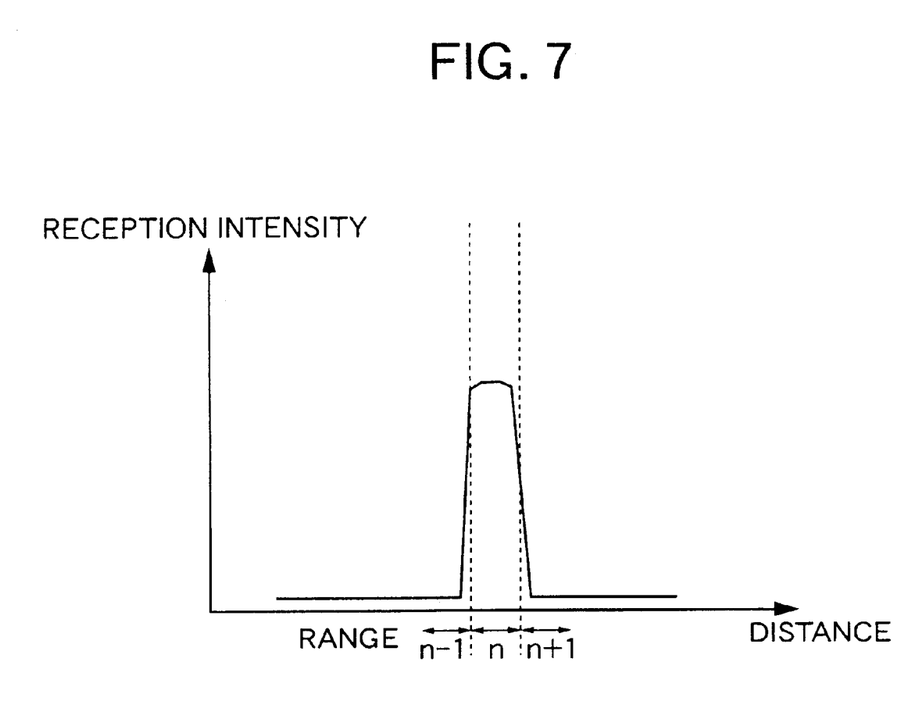
FIG. 7 is a graph illustrating a frequency distribution of distance data of an object detected at a range gate n.

FIG. 7 illustrates a frequency distribution of distance data of an object detected at a range gate n during a predetermined period of time when there is no error in the bandwidth B.

Figure 8:
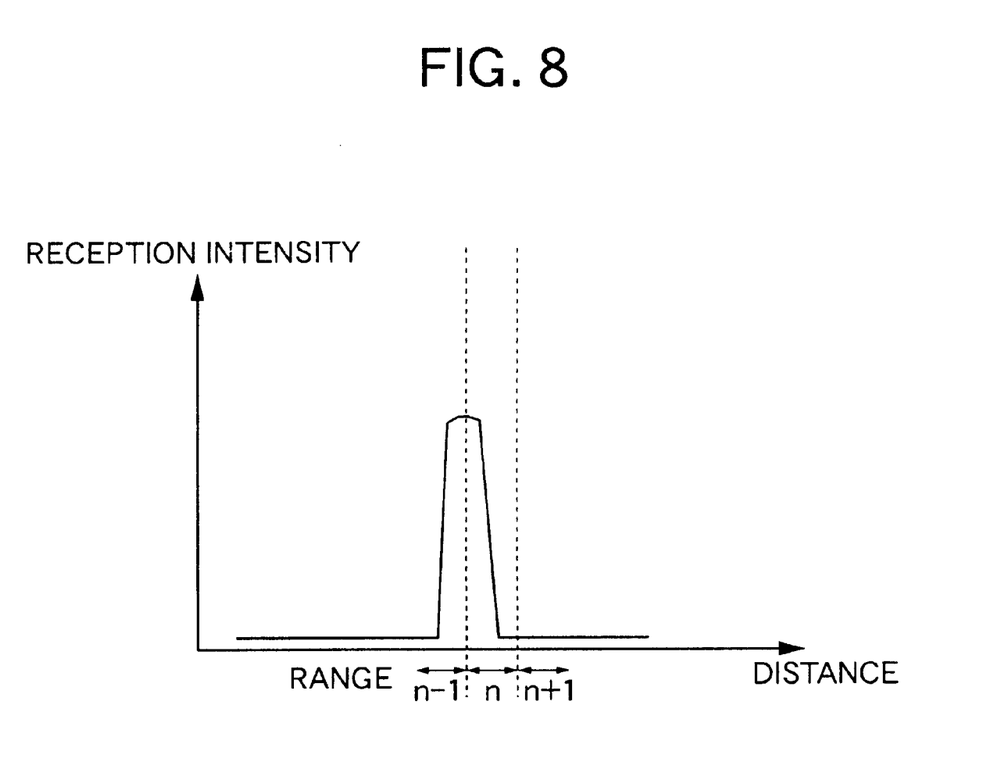
FIG. 8 is a graph illustrating a shift in a frequency distribution of distance data to the nearer direction when the bandwidth is increased.
Figure 9:
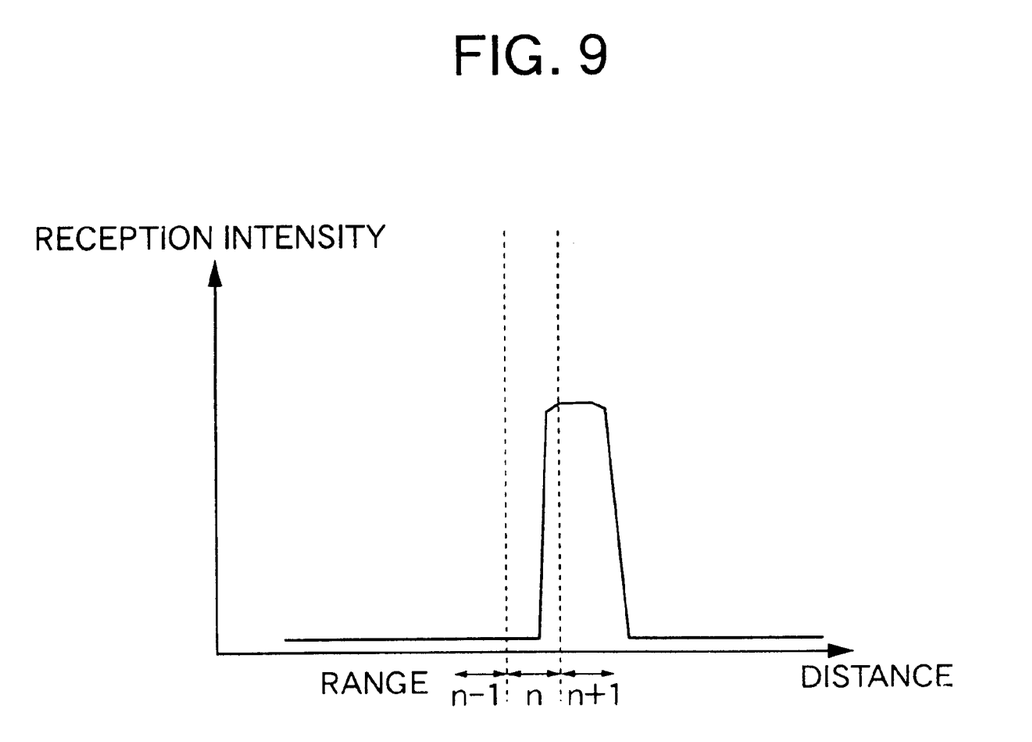
FIG. 9 is a graph illustrating a shift in a frequency distribution of distance data to the farther direction when the bandwidth is decreased.

When the bandwidth B is increased, from equation (9), the frequency distribution of distance data shifts to the left, meaning the shorter detected distance. When the bandwidth B is decreased, the frequency distribution of distance data shifts to the right, meaning the longer detected distance. The distance error can be detected by obtaining the frequency distribution of distance data for each range gate and acquiring an average value or distance shift from a median.

What is claimed is:

1. An FM pulse Doppler radar apparatus which performs pulse modulation of modulating waves having repeatedly increasing and decreasing frequency, which transmits the thus modulated waves, receives, at each range gate having an interval equivalent to a pulse width, reflected waves reflected by at least one object, determines a first distance corresponding to the range gate, and calculates a second distance to said at least one object and a relative velocity of said at least one object based on a difference between frequencies of transmission waves and received waves, said FM pulse Doppler radar apparatus comprising:

velocity determining means for determining a velocity of a vehicle on which said FM pulse Doppler radar apparatus is mounted; and comparison-and-detection means for comparing the obtained first distance corresponding to the range gate with the second distance calculated based on the difference between the frequencies of the transmission waves and the received waves, and for detecting, based on a velocity of a radar-mounted vehicle and the relative velocity between the vehicle and said at least one object, whether a distance error between the first distance and the second distance is due to an error in a transmission frequency bandwidth.

2. The FM pulse Doppler radar apparatus according to claim 1, wherein said comparison-and-detection means detects the distance error due to the error in the transmission frequency bandwidth by comparing a detected range gate number with a range gate number obtained by an inverse operation from the distance calculated from the difference between the frequencies of the transmission waves and the received waves.

3. The FM pulse Doppler radar apparatus according to claim 1, wherein said comparison-and-detection means temporally totals distance errors due to each error in the transmission frequency bandwidth obtained from a plurality of the objects, and finds an average of the total.

4. The FM pulse Doppler radar apparatus according to claim 1, wherein said comparison-and-detection means detects the distance error due to the error in the transmission frequency bandwidth, and corrects the distance calculation result based on the distance error.

5. The FM pulse Doppler radar apparatus according to claim 4, wherein said comparison-and-detection means corrects the distance calculation result by detecting the distance error due to the error in the transmission frequency bandwidth and by correcting the error in the bandwidth of the transmission frequency based on the detected distance error.

6. The FM pulse Doppler radar apparatus according to claim 1, wherein said comparison-and-detection means detects said distance error due to the error in the transmission frequency bandwidth only when the object used for the error detection is stationary.

7. The FM pulse Doppler radar apparatus according to claim 1, wherein said comparison-and-detection means detects said distance error due to the error in the transmission frequency bandwidth only when the radar-mounted vehicle as well as the object used for the error detection are stationary.

8. The FM pulse Doppler radar apparatus according to claim 1, wherein said comparison-and-detection means detects said distance error due to the error in the transmission frequency bandwidth only when the object used for the error detection is a travelling vehicle being followed by the radar-mounted vehicle.

9. The FM pulse Doppler radar apparatus according to claim 1, wherein said comparison-and-detection means temporally adds up distance data on each of the objects calculated from the difference between the frequencies of the transmission waves and the received waves at each range gate, and detects said distance error due to the error in the transmission frequency bandwidth from frequency distribution of the distance data.

10. The FM pulse Doppler radar apparatus according to claim 1, wherein, when said distance error due to the error in the transmission frequency bandwidth exceeds a predetermined value, said comparison-and-detection means determines that the apparatus is functioning abnormally.

* * * * *